US012696337B2

(12) United States Patent
Deng et al.

(10) Patent No.: US 12,696,337 B2
(45) Date of Patent: Jul. 28, 2026

(54) METHOD FOR WIRELESS COMMUNICATION, TERMINAL, AND STORAGE MEDIUM

(71) Applicant: SPREADTRUM COMMUNICATIONS (SHANGHAI) CO., LTD., Shanghai (CN)

(72) Inventors: Yun Deng, Shanghai (CN); Xing Liu, Shanghai (CN); Wei Fan, Shanghai (CN); Lifeng Han, Shanghai (CN); Xiangxin Gu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 357 days.

(21) Appl. No.: 18/250,157

(22) PCT Filed: Oct. 15, 2021

(86) PCT No.: PCT/CN2021/124214
§ 371 (c)(1),
(2) Date: Apr. 21, 2023

(87) PCT Pub. No.: WO2022/083518
PCT Pub. Date: Apr. 28, 2022

(65) Prior Publication Data
US 2023/0397068 A1      Dec. 7, 2023

(30) Foreign Application Priority Data
Oct. 22, 2020      (CN) .......................... 202011144285.8

(51) Int. Cl.
| H04W 76/19 | (2018.01) |
| H04W 36/08 | (2009.01) |
| H04W 36/30 | (2009.01) |

(52) U.S. Cl.
CPC ........... *H04W 76/19* (2018.02); *H04W 36/08* (2013.01); *H04W 36/305* (2018.08)

(58) Field of Classification Search
CPC ... H04W 76/19; H04W 36/08; H04W 36/305; H04W 36/03
See application file for complete search history.

(56) References Cited

U.S. PATENT DOCUMENTS

| 11,064,414 | B1 * | 7/2021 | Oroskar | ........ H04W 36/008357 |
| 2011/0194407 | A1 * | 8/2011 | Ji | .......................... H04B 7/2606 |
| | | | | 370/315 |

(Continued)

FOREIGN PATENT DOCUMENTS

| CN | 102215545 A | 10/2011 |
| CN | 110582128 A | 12/2019 |

(Continued)

OTHER PUBLICATIONS

The extended European search report issued in corresponding EP application No. 21881935.7 dated Mar. 22, 2024.

(Continued)

*Primary Examiner* — Nabil H Syed
(74) *Attorney, Agent, or Firm* — HAUPTMAN HAM, LLP

(57) ABSTRACT

A method for wireless communication, a terminal, and a storage medium are provided in implementations of the disclosure. The method includes: determining, by a terminal, at least one of an available relay or a suitable cell, when a radio link failure or a handover failure is detected by the terminal; and performing, by the terminal, a radio resource control (RRC) reestablishment or a handover procedure through the at least one of the available relay or the suitable cell to access a first cell, where the first cell includes a cell accessed by the available relay or the suitable cell.

20 Claims, 3 Drawing Sheets

WHEN A TERMINAL DETECTS A RADIO LINK FAILURE OR A HANDOVER FAILURE, THE TERMINAL DETERMINES AN AVAILABLE RELAY AND/OR A SUITABLE CELL ⟋ S410

THE TERMINAL PERFORMS THE RRC REESTABLISHMENT OR THE HANDOVER PROCEDURE THROUGH THE AVAILABLE RELAY AND/OR THE SUITABLE CELL TO ACCESS A FIRST CELL ⟋ S420

(56) References Cited

U.S. PATENT DOCUMENTS

| | | | | |
|---|---|---|---|---|
| 2014/0146739 | A1* | 5/2014 | Zhang | H04W 92/20 |
| | | | | 370/315 |
| 2016/0285578 | A1* | 9/2016 | Webb | H04W 36/302 |
| 2017/0086114 | A1 | 3/2017 | Jung et al. | |
| 2017/0208645 | A1 | 7/2017 | Li | |
| 2018/0124674 | A1 | 5/2018 | Vutukuri et al. | |
| 2018/0139640 | A1 | 5/2018 | Chae et al. | |
| 2022/0038984 | A1* | 2/2022 | Vutukuri | H04W 40/22 |
| 2023/0269809 | A1* | 8/2023 | Cheng | H04W 76/19 |
| | | | | 370/216 |
| 2024/0049327 | A1* | 2/2024 | Cai | H04W 76/19 |

FOREIGN PATENT DOCUMENTS

| | | | |
|---|---|---|---|
| CN | 110839258 | A | 2/2020 |
| CN | 111385912 | A | 7/2020 |
| CN | 111586765 | A | 8/2020 |
| EP | 3373652 | A1 | 9/2018 |
| EP | 3281450 | B1 | 10/2021 |
| WO | 2016162722 | A1 | 10/2016 |
| WO | 2018082644 | A1 | 5/2018 |

OTHER PUBLICATIONS

WIPO, International Search Report and Written Opinion for International Application No. PCT/CN2021/124214, Jan. 5, 2022.

The first office action issued in corresponding CN application No. 202011144285.8 dated Jan. 4, 2023.

3GPP "3rd Generation Partnership Project; Technical Specification Group Radio Access Network; Evolved Universal Terrestrial Radio Access (E-UTRA); User Equipment (UE) procedures in idle mode (Release 16)" TS 36.304 V16.0.0, dated Mar. 2020.

3GPP "3rd Generation Partnership Project; Technical Specification Group Radio Access Network; Evolved Universal Terrestrial Radio Access (E-UTRA); Radio Resource Control (RRC); Protocol specification (Release 16)" TS 36.331 V16.0.0, dated Mar. 2020.

Huawei, CMCC "Multiple handover preparations of eNBs with relay" 3GPP TSG RAN WG3 #70 meeting R3-103293, dated Nov. 15-19, 2010.

First Office Action issued in corresponding CN application No. 202310430973.8 dated May 31, 2025.

Second Office Action issued in corresponding CN application No. 202310430973.8 dated Sep. 29, 2025.

Rejection Decision issued in corresponding CN application No. 202310430973.8 dated Dec. 15, 2025.

* cited by examiner

METHOD FOR WIRELESS COMMUNICATION, TERMINAL, AND STORAGE MEDIUM

CROSS-REFERENCE TO RELATED APPLICATION(S)

This application is a National Stage of International Application No. PCT/CN2021/124214, field on Oct. 15, 2021, which claims priority to Chinese Patent Application No. 202011144285.8, filed on Oct. 22, 2020, both of which are incorporated by reference herein.

TECHNICAL FIELD

This disclosure relates to the field of communication technology, in particular to a method for wireless communication, a terminal, and a storage medium.

BACKGROUND

In practical network deployment, a coverage blind spot always exists, and thus a terminal at the coverage blind spot is unable to communicate with a network device. Therefore, the concept of relay is introduced into a standard protocol in 3rd generation partnership project (3GPP), and a network coverage is improved through the relay to solve the coverage blind spot.

However, in a practical relay-based communication process, a problem such as a handover failure or a radio link failure (RLF) often occurs in the communication process. In this case, the terminal needs to resume a radio resource control (RRC) connection, to avoid affecting user experience due to interruption of a service.

SUMMARY

In a first aspect, implementations of the disclosure provide a method for wireless communication. The method is performed by a terminal and includes: determining at least one of an available relay or a suitable cell, when a radio link failure or a handover failure is detected by the terminal; and performing a radio resource control (RRC) reestablishment or a handover procedure through the at least one of the available relay or the suitable cell to access a first cell, where the first cell includes a cell accessed by the available relay or the suitable cell.

In a second aspect, implementations of the disclosure provide a terminal. The terminal includes a processor, a memory, a communication interface, and one or more programs stored in the memory and configured to be executed by the processor. The programs include instructions configured to execute operations in the method of the first aspect of implementations of the disclosure.

In a third aspect, implementations of the disclosure provide a non-transitory computer-readable storage medium. The non-transitory computer-readable storage medium stores a computer program for electronic data interchange, where the computer program causes a computer to perform some or all operations described in the first aspect of implementations of the disclosure.

BRIEF DESCRIPTION OF THE DRAWINGS

To more clearly explain technical solutions in implementations of the disclosure, a brief introduction will be given below on drawings used in the description of implementations or the related art. Apparently, the drawings described below are merely some implementations of the disclosure, and other drawings may be obtained from these drawings without creative effort for those of ordinary skill in the art.

DETAILED DESCRIPTION

Figure 1:
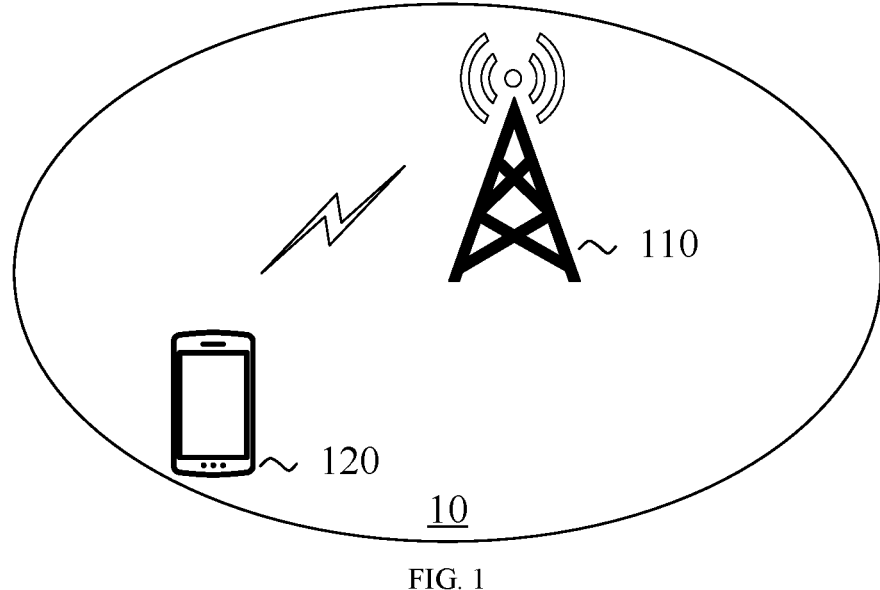
FIG. 1 is a schematic architectural diagram of a wireless communication system provided in implementations of the disclosure.

The following describes technical solutions in implementations of the disclosure with reference to accompanying drawings in implementations of the disclosure. Apparently, the described implementations are some rather than all implementations of the disclosure. All other implementations obtained by a person of ordinary skill in the art based on implementations of the disclosure without creative efforts shall belong to the protection scope of the disclosure.

The technical solutions of implementations of the disclosure may be applied to various wireless communication systems, for example, global system of mobile communication (GSM), code division multiple access (CDMA) system, wideband code division multiple access (WCDMA) system, general packet radio service (GPRS), long term evolution (LTE) system, advanced long term evolution (LTE-A) system, new radio (NR) system, evolution system of NR system, LTE-based access to unlicensed spectrum (LTE-U) system, NR-based access to unlicensed spectrum (NR-U) system, non-terrestrial network (NTN) system, universal mobile telecommunications system (UMTS), wireless local area network (WLAN), wireless fidelity (WiFi), 5th-generation (5G) system, or other communication systems.

Generally, a conventional wireless communication system supports a limited number of connections and is easy to implement. However, with the development of communication technology, the wireless communication system will support not only conventional wireless communication systems, but also device to device (D2D) communication, machine to machine (M2M) communication, machine type communication (MTC), vehicle to vehicle (V2V) communication, or vehicle to everything (V2X) communication, etc. Therefore, the technical solutions of implementations of the disclosure can also be applied to the above wireless communication system.

Alternatively, the wireless communication system in implementations of the disclosure may be applied to beam forming, carrier aggregation (CA), dual connectivity (DC), or standalone (SA) deployment scenario.

Optionally, the wireless communication system in implementations of the disclosure may be applied to an unlicensed spectrum, where the unlicensed spectrum may also be considered as a shared spectrum. Alternatively, the wireless communication system in implementations may also be applied to a licensed spectrum, where the licensed spectrum may also be considered as a non-shared spectrum.

Since various implementations of the disclosure are described in conjunction with a terminal and a network device, the related terminal and network device will be described in detail below.

Specifically, the terminal may be a user equipment (UE), an access terminal, a user unit, a user station, a mobile station, a mobile radio station, a remote station, a remote terminal, a mobile device, a user terminal, a smart terminal, a wireless communication device, a user agent, or a user device. The terminal may also be a cellular telephone, a cordless telephone, a session initiation protocol (SIP) telephone, a wireless local loop (WLL) station, a personal digital assistant (PDA), a handheld device having a wireless communication function, a computing device, or other processing device connected to a wireless modem, a relay device, a vehicle-mounted device, a wearable device, a terminal in a next generation communication system such as an NR network, or a terminal in a future evolved public land mobile network (PLMN), etc., which is not specifically limited.

Further, the terminal may be deployed on land, including indoor or outdoor, handheld, wearable, or vehicle-mounted terminal. The terminal may also be deployed on a water surface (e.g., ship). The terminal may also be deployed in the air (e.g., airplane, balloon, satellite, etc.).

Further, the terminal may be a mobile phone, a tablet computer (e.g., pad), a computer with a wireless transceiving function, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, or the like.

Specifically, the network device may be a device for communication between terminals, and the network device may be a base transceiver station (BTS) in a GSM or CDMA communication system, a base station (e.g., node B, NB) in a WCDMA communication system, an evolved node B (eNB or eNodeB) in an LTE communication system, or a base station (gNB) in an NR communication system. The network device may also be an access point (AP) in a WLAN, a relay station, a network device in a future evolved PLMN, a network device in an NTN, or the like.

It should be noted that, in some network deployments, the gNB may include a centralized unit (CU) and a DU, and the gNB may further include an active antenna unit (AAU). The CU may implement some functions of the gNB, and the DU may implement some other functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a medium access control (MAC) layer, and a physical (PHY) layer. Furthermore, the AAU realizes some physical layer processing functions, radio frequency processing, and related functions of the active antenna. Since the information of the RRC layer will eventually become the information of the PHY layer, or is converted from the information of the PHY layer, in this architecture, the higher-layer signalling (such as RRC layer signalling) can be considered to be sent by the DU or sent by the DU and the AAU. It can be understood that, the network device may include one or more devices of a CU node, a DU node, and an AAU node. Furthermore, the CU may be categorized as a network device in a radio access network (RAN), and the CU may also be categorized as a network device in a core network (CN), which is not specifically limited herein.

Further, the network device may have a feature of mobility, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, or the like. Optionally, the network device may also be a base station disposed at a location such as land or water area.

Further, a network device may provide a service to a cell, and a terminal in the cell may communicate with the network device over a transmission resource (such as a spectrum resource). The cell may include a small cell, a metro cell, a micro cell, a pico cell, and a femto cell.

Exemplarily, a wireless communication system applied in implementations of the disclosure is illustrated in FIG. 1. The wireless communication system 10 may include a network device 110 and a terminal 120, and the network device 110 may be a device that communicates with the terminal 120. The network device 110 may provide a communication coverage for a specific geographical area, and may communicate with the terminal 120 located within the coverage area.

Optionally, the wireless communication system 10 can further include multiple network devices, and in the coverage of each network device, other numbers of terminals can be included, which is not specifically limited herein.

Optionally, the wireless communication system 10 can further include other network entities such as a network controller and a mobility management entity, which are not specifically limited herein.

Optionally, in the wireless communication system 10, communication between the network device and the terminal and between the terminals may be wireless communication or wired communication, which is not specifically limited herein.

Before the method for wireless communication provided in the implementation is described in detail, the related communication technology involved in the implementation is further described.

In a wireless communication system, a terminal can receive system information and paging information within a communication coverage of a network device. When there is a service demand, the terminal may initiate a random access procedure, and establish an RRC connection, and after the security activation is completed, establish a data radio bearer and start service data transmission.

However, when the terminal is out of the communication coverage of the network device, the terminal generally is unable to exchange information with the network device. In practical network deployment, a coverage blind spot always exists, and thus a terminal at the coverage blind spot is unable to communicate with the network device. Therefore, the concept of relay is introduced into a standard protocol in 3GPP, and a network coverage is improved through the relay to solve the coverage blind spot.

Figure 2:
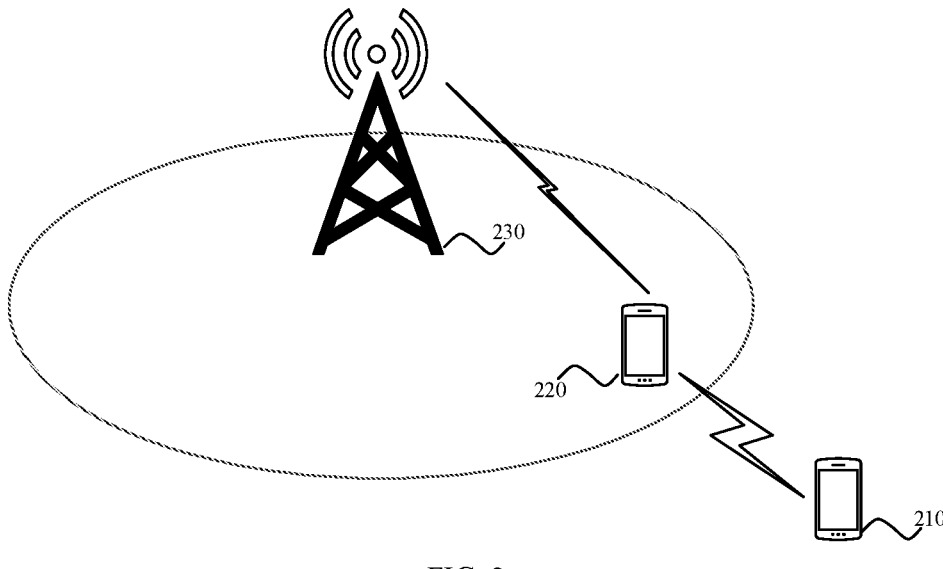
FIG. 2 is a schematic architectural diagram of another wireless communication system provided in implementations of the disclosure.

As illustrated in FIG. 2, a terminal 210 (or referred to as a remote UE) is out of a coverage of a network device 230, and thus the terminal 210 accesses the network through a relay 220 (or referred to as a relay UE) located within the coverage of the network device 230. The relay 220 may be regarded as a terminal having a relay function, the relay 220 communicates with the terminal 210 via the PC5 interface, and a cell corresponding to the network device 230 serves as a serving cell of the terminal 210. In this case, the relay 220 and the serving cell adopt an existing communication mechanism between the terminal and the serving cell, and the relay 220 and the terminal 210 may perform data and signaling interaction through a direct communication mechanism. For the downlink, the relay 220 may forward to the terminal 210 signaling and data sent by the network device 230 to the terminal 210. For the uplink, the relay 220 may forward to the network device 230 signalling and data sent by the terminal 210 to the network device 230.

Figure 3:
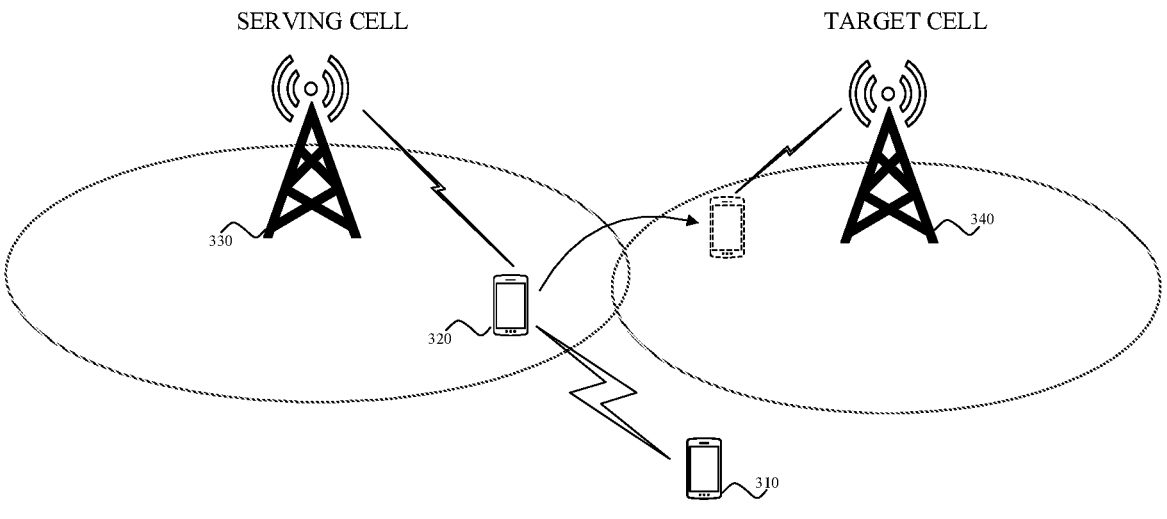
FIG. 3 is a schematic architectural diagram of another wireless communication system provided in implementations of the disclosure.

Furthermore, since the relay may be constantly moving, when the relay 320 moves from the serving cell to a target cell, the relay 320 still serves the terminal 310, as illustrated in FIG. 3. The network device corresponding to the serving cell is the network device 330, and the network device corresponding to the target cell is the network device 340.

However, in a practical relay-based communication process, there also exist the following communication scenarios.

Scenario 1. First, a terminal (or referred to as a remote UE) is in a connected state in a serving cell, and since a signal of the serving cell is too poor, the terminal detects whether there is an available relay. If there is an available relay, the serving cell may hand over the terminal to the available relay, and the available relay provides a service for the terminal.

Scenario 2. First, a terminal is in a connected state in a serving cell, and the serving cell configures for the terminal one or more candidate relays and a corresponding handover execution condition. Then, when the terminal determines one candidate relay satisfying the handover execution condition from the one or more candidate relays, the terminal hands over to the candidate relay.

Scenario 3. A terminal is in a connected state in a serving cell, and the terminal has established communication with a network device corresponding to the serving cell through the relay, where a service can be carried out successfully. In this case, the terminal needs to hand over from the relay to a new relay or from the relay to the serving cell.

In each of the foregoing handover procedure, the terminal may detect a handover failure or a radio link failure (RLF), and the terminal may adopt a processing mechanism specified in a communication protocol at present. For example, the terminal performs cell selection, and if there is a suitable cell, the terminal initiates an RRCreestablishmentrequest to perform a reestablishment procedure; if there is no suitable cell, the terminal enters an idle state. Because the terminal will easily enter the idle state due to not finding a suitable cell, the terminal is unable to continue to carry out the service, thereby affecting user experience.

Figure 4:
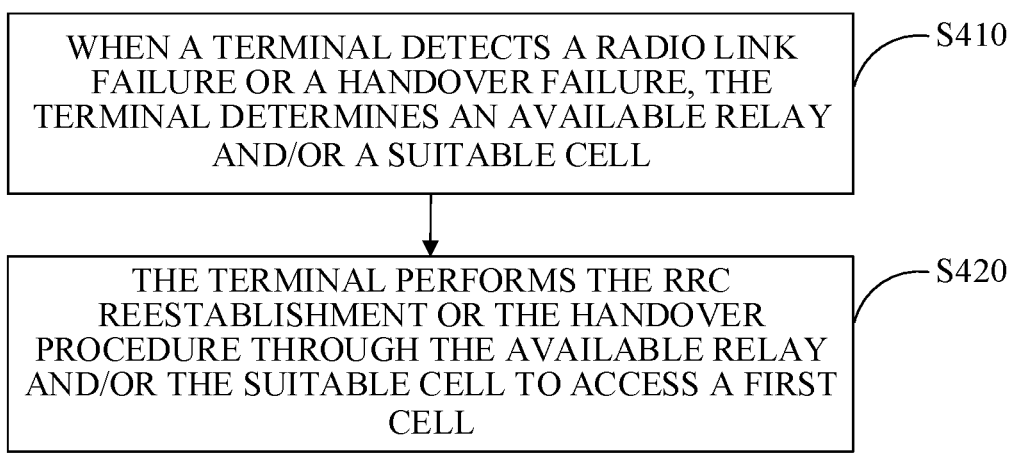
FIG. 4 is a schematic flow chart of a method for wireless communication provided in implementations of the disclosure.

For the handover procedures in the foregoing "scenario 1", "scenario 2", and "scenario 3", or other handover procedures in the wireless communication system of the disclosure, implementations of the disclosure provide a schematic flow chart of a method for wireless communication, as illustrated in FIG. 4. The method for wireless communication can be applied to the wireless communication system in implementations of the disclosure. The method includes the following.

At S410, when a terminal detects a radio link failure or a handover failure, the terminal determines an available relay and/or a suitable cell.

It should be noted that, in implementations of the disclosure, the terminal may be in a connected state (RRC_CO- NNECTED) in a serving cell or in the connected state by accessing a network via a relay. Furthermore, in implementations of the disclosure, the radio link failure or the handover failure detected by the terminal may be a handover failure or a radio link failure in each handover procedure in the foregoing "scenario 1", "scenario 2", and "scenario 3". That is, the radio link failure may occur in a process of detecting for an available relay by the terminal, or the radio link failure may occur in a process of determining whether there is a candidate relay satisfying a handover execution condition in at least one candidate relay configured by the network. Alternatively, the handover failure may occur during handover from the serving cell to the detected available relay by the terminal, the handover failure may occur during handover to the configured candidate relay by the terminal, the handover failure may occur during handover from the relay to a new relay by the terminal, or the handover failure may occur during handover from the relay to the serving cell by the terminal, which is not specifically limited herein.

It should be further noted that, the terminal determines the available relay and/or the suitable cell, which may be understood as that the terminal may determine only the available relay, may also determine only the suitable cell, and may also determine both the available relay and the suitable cell, which is not specifically limited herein.

For example, in "scenario 1", when the terminal performs handover to the available relay, if the terminal is unable to establish communication with the available relay within a preset time, or even if the terminal has communicated with the available relay, but the available relay notifies the terminal that the available relay is unable to continue to play the relay role (for example, the available relay is unable to communicate with a cell accessed by the available relay), the handover fails.

The implementations of the disclosure will be described in detail below as to how the terminal determines the available relay cell and/or the suitable cell.

In one possible example, the terminal determines the available relay and/or the suitable cell as follows. The terminal performs a relay discovery procedure and/or a relay detection procedure to determine the available relay; and/or the terminal determines the available relay from at least one candidate relay configured by a network; and/or the terminal performs a cell selection procedure to determine the suitable cell; and/or the terminal performs the cell selection procedure to determine the suitable cell, and determines the available relay according to system information of the suitable cell.

It should be noted that, the at least one candidate relay configured by the network may be configured by the network to the terminal through signaling before the terminal detects the radio link failure or the handover failure. The network may be a network device corresponding to the serving cell, or the network may be another device in the wireless communication system, which is not specifically limited.

It should be further noted that, in the process of determining the available relay and/or the suitable cell, the terminal may perform the relay discovery procedure and/or the relay detection procedure, may obtain the at least one candidate relay configured by the network, may perform the cell selection procedure, and may also obtain the system information of the suitable cell in determining the suitable cell by performing the cell selection procedure. Specific processes or operations to be performed by the terminal are described below with reference to multiple cases.

Case 1

Specifically, if the terminal has determined the available relay, the terminal does not perform the cell selection procedure.

As can be understood, in the process of determining the available relay and/or the suitable cell, if the terminal has determined the available relay by performing the relay discovery procedure and/or the relay detection procedure, or if the terminal has determined the available relay from the at least one candidate relay configured by the network, the terminal will not perform the cell selection procedure.

It should be noted that, if the terminal has found the available relay, the cell selection procedure is not performed. In this case, the terminal may directly perform an RRC reestablishment or a handover procedure through the available relay to access a cell accessed by the available relay, such that the terminal can continue to carry out the service. Meanwhile, this manner can ensure that the terminal can resume the RRC connection or data communication as soon as possible, and reduce the large delay that may be introduced due to cell selection.

Case 2

Specifically, when the terminal performs the relay discovery procedure and/or the relay detection procedure, if no available relay is found, the terminal performs the cell selection procedure.

It can be understood that, in the process of determining the available relay and/or the suitable cell, if the terminal does not find the available relay by performing the relay discovery procedure and/or the relay detection procedure, the terminal needs to perform the cell selection procedure. Furthermore, in performing the relay discovery procedure and/or the relay detection procedure, the terminal does not find the available relay within the preset time due to reasons such as time limitation, and thus the terminal performs the cell selection procedure, thereby avoiding the terminal being unable to quickly resume a connection due to long-time relay detection, and avoiding affecting the user experience.

Case 3

Specifically, the relay discovery procedure and/or the relay detection procedure and the cell selection procedure are performed in parallel or simultaneously by the terminal.

It can be understood that, in the process of determining the available relay and/or the suitable cell, the terminal may perform the relay discovery procedure and/or the relay detection procedure as well as the cell selection procedure in parallel or at the same time.

Case 4

Specifically, the relay discovery procedure and/or the relay detection procedure is preferentially performed by the terminal; or the cell selection procedure is preferentially performed by the terminal.

It should be noted that, in implementations of the disclosure, whether the terminal preferentially performs the relay discovery procedure and/or the relay detection procedure or preferentially performs the cell selection procedure can be determined by means of a specific handover scenario. For example, in "scenario 1", when a signal from the serving cell to the terminal becomes poor, that is, the terminal detects that the signal quality of the serving cell is very poor and there is no other neighbouring cell available for handover, the terminal is most likely to perform handover via the available relay. In this case, the terminal may preferentially perform the relay discovery procedure and/or the relay detection procedure. In "scenario 3", when the terminal needs to hand over from the relay to the new relay, the terminal may preferentially perform the relay discovery procedure and/or the relay detection procedure. In "scenario 3", when the terminal needs to hand over from the relay to the serving cell, the terminal may preferentially perform the cell selection procedure. Furthermore, it is limited by time for the terminal to preferentially perform the relay discovery procedure and/or the relay detection procedure or to preferentially perform the cell selection procedure. For example, within the preset time, the terminal preferentially performs a certain process, and if no available relay or suitable cell is found within the preset time, another process is performed.

Case 5

Specifically, the terminal performs the relay discovery procedure and/or the relay detection procedure if no suitable cell is found when the terminal performs the cell selection procedure.

It can be understood that, in the process of determining the available relay and/or the suitable cell, if the terminal does not find the suitable cell (or does not find the suitable cell within the preset time) by performing the cell selection procedure, the terminal needs to perform the relay discovery procedure and/or the relay detection procedure.

As can be seen, in the process of determining the available relay and/or the suitable cell, according to the above various cases, procedures or operations that need to be specifically performed by the terminal to resume the RRC connection are determined, which is beneficial to improving the flexibility of the entire wireless communication system. Furthermore, multiple manners for the terminal to resume the RRC connection are provided, to ensure the terminal to resume the RRC connection or data communication as soon as possible, reduce the time delay in resuming the RRC connection, and improve the probability of resuming the RRC connection by the terminal.

The relay discovery procedure will be described in detail hereinafter in implementations of the present disclosure.

Specifically, the relay discovery procedure may include: receiving first information by the terminal, where the first information indicates at least one relay that provides a relay service.

It should be noted that, because the terminal is unable to know which relay can provide the relay service for the terminal, in implementations of the disclosure, a relay(s) which can provide the relay service broadcasts the first information to the surroundings, where the first information indicates that the relay can provide the relay service. In this case, the terminal can know the at least one relay providing the relay service by receiving the first information.

Specifically, the relay discovery procedure may include: sending a relay request message by the terminal and receiving by the terminal second information in response to the relay request message, where the second information indicates at least one relay that provides the relay service.

It should be noted that, because the terminal is unable to know which relay is available for providing the relay service to the terminal, it is considered in implementations of the disclosure that the terminal broadcasts or sends the relay request message to the surroundings. If a relay(s) receives the relay request message and the relay is willing to provide the relay service to the terminal, the relay sends to the terminal the second information in response to the relay request message. Finally, by receiving the second information, the terminal can know that there is at least one relay providing the relay service.

The relay detection procedure will be described in detail hereinafter in implementations of the present disclosure.

Specifically, the relay detection procedure may include: obtaining, by the terminal, a signal sent by the at least one relay, and determining, by the terminal, whether the signal sent by the at least one relay satisfies a first preset condition. It should be noted that, in implementations of the disclosure, the at least one relay may be first determined through the relay discovery procedure, and then through the relay detection procedure, it is determined whether a relay satisfying the first preset condition exists in the at least one relay, so that the relay satisfying the first preset condition is used as the available relay.

Further, the signals sent by the at least one relay may include at least one of: a synchronization signal and a demodulation reference signal (DMRS).

Further, the first preset condition may include that: a quality of the signal sent by the at least one relay exceeds a preset threshold when the terminal detects or measures the quality of the signal sent by the at least one relay (i.e., the terminal detects or measures the signal sent by the relay and evaluates the quality of the signal).

The quality of the signal sent by the at least one relay may be represented by reference signal received power (RSRP), reference signal received quality (RSRQ), signal to interference plus noise ratio (SINR), or the like.

Further, the first preset condition may be specified by the standard protocol, may be configured by the network, and may also be preconfigured.

In conclusion, in a possible example, the terminal performs the relay discovery procedure and/or the relay detection procedure to determine the available relay as follows. The terminal performs the relay discovery procedure to determine at least one relay, and the terminal performs the relay detection procedure, and determines a relay satisfying the first preset condition among the at least one relay as the available relay.

It can be understood that, after the terminal finds the at least one relay, the terminal needs to detect whether the signal of the at least one relay satisfies the first preset condition. The terminal detects whether the quality of the signal of the at least one relay exceeds the preset threshold, and takes a relay with a quality of signal exceeding the preset threshold as the available relay. Furthermore, after the terminal determines the available relay through the relay discovery procedure and/or the relay detection procedure, the terminal can perform the RRC reestablishment through the available relay, such that the terminal can accesses the cell accessed by the available relay, the terminal can resume the RRC connection or data communication as soon as possible, and the terminal can continue to carry out the service. Furthermore, performing the RRC reestablishment through the relay can be: sending by the terminal an RRC reestablishment request to the relay and forwarding by the relay the reestablishment request to the cell accessed by the relay. If the cell allows the reestablishment request of the terminal, the cell returns an RRC reestablishment message to the relay, so that the terminal can resume signaling interaction with the network through the reestablishment message.

It should be noted that, the above procedure of determining the available relay is divided into the relay discovery procedure and the relay detection procedure. In practice, the two processes may also be collectively referred to as a discovery procedure of relay or a search procedure of relay. Alternatively, the relay discovery procedure and the relay detection procedure may be performed at the same time. For example, when the terminal receives the first information sent by the relay, where the first information contains a demodulation reference signal, the terminal may evaluate whether the received demodulation reference signal satisfies the first preset condition.

Specifically, if the number of relays satisfying the first preset condition among the at least one relay is greater than or equal to 2, the available relay may satisfy one of: the available relay being a random relay among the relays satisfying the first preset condition or the available relay being a relay with the strongest RSRP among the relays satisfying the first preset condition.

It can be understood that, when the terminal performs the relay detection procedure, if at least two relays satisfy the first preset condition, the terminal may randomly select a relay from the at least two relays as the available relay, and may also select a relay with the strongest RSRP from the at least two relays as the available relay, thereby improving the flexibility of the wireless communication system.

Furthermore, in implementations of the disclosure, the terminal may be at the edge of the serving cell, and the terminal is in the connected state. Therefore, when the serving cell finds that no suitable neighboring cell can continue to provide the service for the terminal, the network device corresponding to the serving cell may notify the terminal to perform the relay detection procedure and report the available relay to the network device corresponding to the serving cell, so that the network device corresponding to the serving cell can switch the terminal to the available relay. Furthermore, the serving cell needs to first communicate with the cell (which may be a neighbouring cell or the serving cell accessed by the terminal) accessed by the available relay, and negotiate resource allocation of the terminal. Then, the cell accessed by the available relay returns allocated resources to the network device corresponding to the serving cell. Thereafter, the network device corresponding to the serving cell sends a handover command to the terminal, where the handover command contains information such as resources allocated to the terminal by the cell accessed by the available relay. Finally, after receiving the handover command, the terminal hands over to the available relay.

In the following implementations of the present disclosure, how the terminal determines the available relay from the at least one candidate relay configured by the network will be described in detail.

In one possible example, the terminal determines the available relay from the at least one candidate relay configured by the network as follows. The terminal obtains the at least one candidate relay and a handover execution condition that are configured by the network. The terminal determines a candidate relay satisfying the handover execution condition or a second preset condition among the at least one candidate relay as the available relay.

It should be noted that, the network device corresponding to the serving cell may preconfigure for the terminal the at least one candidate relay and the corresponding handover execution condition, and the network device has negotiated related information such as resource allocation in advance with the cell accessed by the at least one candidate relay (and the candidate relay). In this case, when the terminal determines the available relay from the at least one candidate relay, the terminal may directly hand over to the available relay, thereby accessing the cell accessed by the available relay. Compared with the process of performing by the terminal the relay discovery procedure and/or the relay detection procedure and the RRC reestablishment for handover, configuring the at least one candidate relay and the corresponding handover execution condition by the network facilitates improving the RRC restoration efficiency and ensuring the terminal to resume data communication as soon as possible.

Specifically, the second preset condition may include that: a quality of the signal sent by the at least one candidate relay exceeds a preset threshold when the terminal detects the quality of the signal sent by the at least one candidate relay (i.e., the terminal detects the signal sent by the candidate relay and evaluates the quality of the signal).

The cell selection procedure will be specifically described below in implementations of the disclosure.

Specifically, the cell selection procedure may include: scanning, by the terminal, a supported frequency point to search for a suitable cell with the strongest RSRP on the frequency point.

It should be noted that, in the cell selection procedure of implementations of the disclosure, the terminal performs cell selection, and the terminal finds at least one cell satisfying a cell selection condition. Furthermore, the cell selection condition may be an S criterion specified in the standard protocol TS38.304. The S criterion is that: a signal of a cell satisfies a preset condition and on the frequency point on which the cell is located, the RSRP of the cell measured by the terminal is the strongest. The signal of the cell may include a synchronization signal.

In conclusion, in one possible example, the terminal performs the cell selection procedure to determine the suitable cell as follows. The terminal scans one or more supported frequency points. The terminal measures RSRPs of suitable cells on the supported frequency points, and determines a suitable cell with the strongest RSRP on the frequency points as a target cell in cell selection.

It should be noted that, after the terminal determines the suitable cell through the cell selection procedure, the terminal may perform the RRC reestablishment through the suitable cell, so that the terminal can access the suitable cell, thereby ensuring the terminal to resume the RRC connection or data communication as soon as possible, and continue to carry out the service.

In the following, how the terminal performs the cell selection procedure to determine the suitable cell and determines the available relay according to the system information of the suitable cell will be described in detail.

In a possible example, the terminal performs the cell selection procedure to determine the suitable cell and determines the available relay according to the system information of the suitable cell as follows. The terminal scans one or more supported frequency points. The terminal measures RSRPs of cells on the supported frequency points, and determines a suitable cell with the strongest RSRP on the frequency points as a target cell in cell selection. The terminal obtains the system information of the suitable cell (i.e., the target cell). The terminal determines the available relay through the system information, where the system information carries configuration information for supporting access of the relay.

It should be noted that, the terminal can obtain the configuration information for supporting access of the relay according to the configuration information in the system information of the suitable cell. In this case, the terminal may perform the relay discovery and/or the relay detection procedure to discover at least one available relay accessing this cell, and then select one relay to perform the RRC reestablishment, to access the cell accessed by the available relay, thereby ensuring that the terminal can resume the RRC connection or data communication as soon as possible, and ensuring that the terminal can continue to carry out the service.

Specifically, if the terminal does not find the available relay, the terminal may perform the RRC reestablishment through the suitable cell.

In conclusion, the available relay in implementations of the disclosure may include the available relay determined through the relay discovery procedure and/or the relay detection procedure, the available relay determined from the at least one candidate relay configured by the network, and the available relay determined according to the system information of the suitable cell. Therefore, when the above multiple cases exist at the same time, in implementations of the disclosure, the relay corresponding to the strongest RSRP is taken as the available relay.

As can be seen from the above description, in "scenario 2", the terminal may detect the handover failure in the process of switching to the configured candidate relay. Therefore, in this case, how the terminal determines the available relay and/or the suitable cell is described below in implementations of the disclosure.

In a possible example, if the handover failure detected by the terminal is a handover failure of the terminal during handover to a first candidate relay, and the first candidate relay is one of the at least one candidate relay configured by the network, the terminal determines the available relay and/or the suitable cell as follows. The terminal determines the available relay from relays other than the first candidate relay among the at least one candidate relay configured by the network; and/or the terminal performs the relay discovery procedure and/or the relay detection procedure to determine the available relay; and/or the terminal performs the cell selection procedure to determine the suitable cell; and/or the terminal performs the cell selection procedure to determine the suitable cell, and determines the available relay according to the system information of the suitable cell.

It should be noted that, the difference between this example and the above example describing determining the available relay and/or the suitable cell by the terminal is only that: if the terminal fails during handover to the first candidate relay, there is a way in which the terminal needs to determine the available relay from the relays other than the first candidate relay among the at least one candidate relay configured by the network. Other ways to determine the available relay and/or the suitable cell are consistent with the above example. A person skilled in the art may know the detailed implementation of this example through the description of the above example, which is not repeated herein.

At S420, the terminal performs the RRC reestablishment or the handover procedure through the available relay and/or the suitable cell to access a first cell.

The first cell may include the cell accessed by the available relay or the suitable cell.

It should be noted that, as can be seen from the above description, the terminal may only determine the available relay, may only determine the suitable cell, and may also all determine the available relay and the suitable cell. In this case, when the available relay is determined by the terminal from the at least one candidate relay configured by the network, the terminal can directly access the available relay through the handover procedure, and then access the cell accessed by this relay, i.e., the first cell. Furthermore, the terminal needs to access the cell accessed by the available relay through the RRC reestablishment procedure, or access the suitable cell through the RRC reestablishment procedure. Finally, it is ensured that the terminal resumes the RRC connection or data communication as soon as possible, thereby reducing the time delay in resuming the RRC connection, improving the probability of resuming the RRC connection by the terminal, and allowing the terminal to continue the service.

It should be further noted that, when the terminal finds the available relay and the suitable cell, the terminal may determine, according to an RSRP of the available relay and an RSRP of the suitable cell, whether to access the available relay (and further access the cell accessed by the available relay through the available relay) or to access the suitable cell. Detailed description will be given below.

In a possible example, the terminal performs the RRC reestablishment or the handover procedure through the available relay and/or the suitable cell to access the first cell as follows. When the terminal has determined the available relay and the suitable cell, the terminal obtains the RSRP of the available relay and the RSRP of the suitable cell. The terminal determines a relay or cell corresponding to the strongest RSRP in the RSRP of the available relay and the RSRP of the suitable cell. The terminal performs the RRC reestablishment or the handover procedure according to the relay or a cell corresponding to the strongest RSRP to access the first cell.

It should be noted that, when the terminal has determined the available relay and the suitable cell, the terminal may sort the RSRP of the available relay and the RSRP of the suitable cell, and select the strongest RSRP. If the strongest RSRP corresponds to the available relay, the terminal performs the RRC reestablishment or the handover procedure through the available relay to access the cell accessed by the available relay. If the strongest RSRP corresponds to the suitable cell, the terminal performs the RRC reestablishment or the handover procedure through the suitable cell to access the suitable cell.

It should be further noted that, in implementations of the disclosure, it is further considered that there may be a difference between a signal sent by a relay and a signal sent by a cell, for example, there may be a difference in a signal power sent or in a signal quality sent, and therefore, a corresponding offset may be added in implementations of the disclosure. The detailed description is as follows.

Specifically, in the process of determining the strongest RSRP from the RSRP of the available relay and the RSRP of the suitable cell, a corresponding offset may be added to the RSRP of the available relay and the RSRP of the suitable cell.

The offsets may be different. For example, the RSRP of the available relay after adding a corresponding offset may be denoted as RSRP (Relay)+offset_1, and the RSRP of the suitable cell after adding a corresponding offset may be denoted as RSRP (Cell)+offset_2, and then comparison is performed between results obtained after adding corresponding offsets.

Further, the offset may be specified by the standard protocol, may be configured by the network, or may be preconfigured.

Further, the offset may be a positive value, a negative value, or 0.

In a possible example, the terminal performs the RRC reestablishment or the handover procedure through the available relay and/or the suitable cell to access the first cell as follows. The terminal preferentially performs the handover procedure through the available relay to access the first cell; or the terminal preferentially performs the RRC reestablishment through the available relay to access the first cell; or the terminal preferentially performs RRC reestablishment through the suitable cell to access the first cell; or the terminal performs the RRC reestablishment or the handover procedure through the relay or cell corresponding to the strongest RSRP in the RSRP of the available relay and the RSRP of the suitable cell to access the first cell.

It can be understood that, in the process of performing by the terminal the RRC reestablishment or the handover procedure through the available relay and/or the suitable cell to resume the RRC connection, in implementations of the disclosure, a strategy preferentially executed (for example, performing the RRC reestablishment through the available relay preferentially) or a strategy for determining the strongest RSRP is considered, facilitating improving flexibility of the entire wireless communication system. Meanwhile, since different manners for resuming the RRC connection are provided, the terminal can resume the RRC connection or data communication as soon as possible, the time delay in resuming the RRC connection can be reduced, and the probability of resuming the RRC connection by the terminal can be improved.

Furthermore, since the available relay may be one candidate relay in the at least one candidate relay configured by the network, before S420, the terminal may perform handover according to a corresponding configuration of the candidate relay, which is specifically described as follows.

In a possible example, before the terminal performs the RRC reestablishment or the handover procedure through the available relay and/or the suitable cell to access the first cell, the method further includes the following operations. If the available relay is a second candidate relay, the terminal performs handover according to a corresponding configuration of the second candidate relay to access the second candidate relay, where the second candidate relay is one of the at least one candidate relay configured by the network.

Further, before the terminal performs the RRC reestablishment or the handover procedure through the available relay and/or the suitable cell to access the first cell, the method further includes the following operations. If the terminal fails during handover to the second candidate relay, the terminal determines the available relay from relays other than the second candidate relay among the at least one candidate relay.

As can be seen, in implementations of the disclosure, when the terminal detects the radio link fail or the handover fail, the terminal determines the available relay and/or the suitable cell. The terminal then performs the RRC reestablishment or the handover procedure through the available relay and/or the suitable cell to access the first cell. When the terminal detects the radio link failure or the handover failure, due to not finding the suitable cell, the terminal will easily enter the idle state, and the terminal is unable to continue to carry out the service. Therefore, in the disclosure, the RRC reestablishment or the handover procedure is performed through the available relay and/or the suitable cell, so that the terminal can access the cell accessed by the available relay or access the suitable cell, thereby reducing time delay in resuming an RRC connection, ensuring the terminal to resume the RRC connection or data communication as soon as possible, improving the probability that the terminal resumes the RRC connection, and ensuring the terminal to continue to carry out the service.

In the above, solutions of implementations of the disclosure are mainly introduced from the perspective of the method. It can be understood that, to realize the above functions, the terminal includes a corresponding hardware structure and/or software module for performing each function. Those of ordinary skill in the art will understand that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be considered beyond the scope of the disclosure.

In implementations of the disclosure, functional units of the terminal can be divided according to the above method examples. For example, each function may correspond to each function unit, or two or more functions may be integrated into one processing unit. The integrated unit can be realized either in the form of hardware or in the form of software program module. It should be noted that, the division of the units in implementations of the disclosure is schematic and is merely a logical function division, and there can be another division manner in practical implementation.

Figure 5:
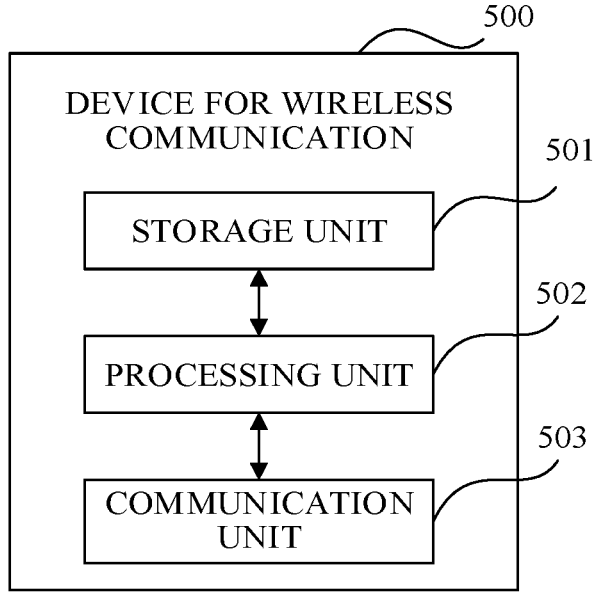
FIG. 5 is a block diagram illustrating functional units of a device for wireless communication provided in implementations of the disclosure.

In the case of integrated units, FIG. 5 illustrates a block diagram of functional units of a device for wireless communication. The device 500 for wireless communication is applied to a terminal and includes a processing unit 502 and a communication unit 503. The processing unit 502 is used to control and manage operations of the terminal. For example, the processing unit 502 is used to support the terminal to perform some operations in FIG. 4 and other processes of the technical solutions described herein. The communication unit 503 is used to support communication between the terminal and other devices in the wireless communication system. The device 500 for wireless communication may also include a storage unit 501 for storing program codes and data of the terminal.

The processing unit 502 may be a processor or a controller, such as a central processing unit (CPU), a general purpose processor, a digital signal processor (DSP), an application-specific integrated circuit (ASIC), a field programmable gate array (FPGA), or other programmable logic devices, transistor logic devices, hardware components, or any combination thereof. It can implement or execute various exemplary logic blocks, modules, and circuits described in conjunction with the disclosure. The processing unit 502 may also be a combination that implements computing functions, for example, a combination of one or more microprocessors, a combination of DSP and microprocessors, and the like. The communication unit 503 may be a communication interface, a transceiver, a transceiver circuit, and the like, and the storage unit 501 may be a memory. When the processing unit 502 is a processor, the communication unit 503 is a communication interface, and the storage unit 501 is a memory, the device 500 for wireless communication of implementations of the disclosure may be a terminal illustrated in FIG. 6.

In particular implementation, the processing unit 502 is used to perform any operation performed by the terminal in the above method implementations, and when data transmission such as sending is performed, the communication unit 503 can be selectively invoked to complete the corresponding operation. Details are given below.

The processing unit 502 is configured to: determine at least one of an available relay or a suitable cell, when a radio link failure or a handover failure is detected by the terminal; and perform an RRC reestablishment or a handover procedure through the at least one of the available relay or the suitable cell to access a first cell, where the first cell includes a cell accessed by the available relay or the suitable cell.

As can be seen, in implementations of the disclosure, when the terminal detects the radio link fail or the handover fail, the terminal determines the available relay and/or the suitable cell. The terminal then performs the RRC reestablishment or the handover procedure through the available relay and/or the suitable cell to access the first cell. When the terminal detects the radio link failure or the handover failure, due to not finding the suitable cell, the terminal will easily enter an idle state, and the terminal is unable to continue to carry out a service. Therefore, in the disclosure, the RRC reestablishment or the handover procedure is performed through the available relay and/or the suitable cell, so that the terminal can access a cell accessed by the available relay or access the suitable cell, thereby reducing time delay in resuming an RRC connection, ensuring the terminal to resume the RRC connection or data communication as soon as possible, improving a probability that the terminal resumes the RRC connection, and ensuring the terminal to continue to carry out the service.

In a possible implementation, the processing unit 502 configured to determine the at least one of the available relay or the suitable cell is configured to: perform at least one of a relay discovery procedure or a relay detection procedure to determine the available relay; and/or determine the available relay from at least one candidate relay configured by a network; and/or perform a cell selection procedure to determine the suitable cell; and/or perform the cell selection procedure to determine the suitable cell, and determine the available relay according to system information of the suitable cell.

In a possible implementation, the relay discovery procedure includes: receiving first information, where the first information indicates at least one relay providing a relay service; or the relay discovery procedure includes: sending a relay request message, and receiving second information in response to the relay request message, where the second information indicates at least one relay providing the relay service.

In a possible implementation, the relay detection procedure includes: obtaining a signal sent by the at least one relay, and determining whether the signal sent by the at least one relay satisfies a first preset condition.

In a possible implementation, the signal sent by the at least one relay includes at least one of: a synchronization signal or a demodulation reference signal.

In a possible implementation, the first preset condition includes: a quality of the signal sent by the at least one relay exceeding a preset threshold, when the terminal detects the quality of the signal sent by the at least one relay.

In a possible implementation, the processing unit 502 configured to perform the at least one of the relay discovery procedure or the relay detection procedure to determine the available relay is configured to: perform the relay discovery procedure to determine at least one relay; and perform the relay detection procedure, and determine a relay satisfying a first preset condition among the at least one relay as the available relay.

In a possible implementation, when the number of relays satisfying the first preset condition among the at least one relay is greater than or equal to 2, the available relay satisfies one of: the available relay being a random relay among the relays satisfying the first preset condition or the available relay being a relay with the strongest reference signal received power (RSRP) among the relays satisfying the first preset condition.

In a possible implementation, the processing unit 502 configured to determine the available relay from the at least one candidate relay configured by the network is configured to: obtain the at least one candidate relay and a handover execution condition that are configured by the network; and determine a candidate relay satisfying the handover execution condition or a second preset condition among the at least one candidate relay as the available relay.

In a possible implementation, the second preset condition includes: a quality of the signal sent by the at least one candidate relay exceeding a preset threshold, when the terminal detects the quality of the signal sent by the at least one candidate relay.

In a possible implementation, when the available relay has been found, the cell selection procedure is stopped.

In a possible implementation, the cell selection procedure is performed if no available relay is found when the at least one of the relay discovery procedure or the relay detection procedure is performed.

In a possible implementation, the at least one of the relay discovery procedure or the relay detection procedure is performed by the terminal in parallel or simultaneously with the cell selection procedure.

In a possible implementation, the at least one of the relay discovery procedure or the relay detection procedure is preferentially performed by the terminal; or the cell selection procedure is preferentially performed by the terminal.

In a possible implementation, the at least one of the relay discovery procedure or the relay detection procedure is performed if no suitable cell is found when the cell selection procedure is performed.

In a possible implementation, when the handover failure detected is a handover failure of the terminal during handover to a first candidate relay, and the first candidate relay is one of at least one candidate relay configured by a network, the processing unit 502 configured to determine the at least one of the available relay or the suitable cell is configured to: determine the available relay from relays other than the first candidate relay, among the at least one candidate relay configured by the network; and/or perform at least one of a relay discovery procedure or a relay detection procedure to determine the available relay; and/or perform the cell selection procedure to determine the suitable cell; and/or perform the cell selection procedure to determine the suitable cell, and determine the available relay according to system information of the suitable cell.

In a possible implementation, the processing unit 502 configured to perform the RRC reestablishment or the handover procedure through the at least one of the available relay or the suitable cell to access the first cell is configured to: obtain an RSRP of the available relay and an RSRP of the suitable cell, when the available relay and the suitable cell have been found; determine a relay or cell corresponding to the strongest RSRP in the RSRP of the available relay and the RSRP of the suitable cell; and perform the RRC reestablishment or the handover procedure according to the relay or cell corresponding to the strongest RSRP to access the first cell.

In a possible implementation, in the process of determining the strongest RSRP from the RSRP of the available relay and the RSRP of the suitable cell, a corresponding offset is added to at least one of the RSRP of the available relay or the RSRP of the suitable cell.

In a possible implementation, the processing unit 502 configured to perform the RRC reestablishment or the handover procedure through the at least one of the available relay or the suitable cell to access the first cell is configured to: perform the handover procedure through the available relay preferentially to access the first cell; or perform the RRC reestablishment through the available relay preferentially to access the first cell; or perform the RRC reestablishment through the suitable cell preferentially to access the first cell; or perform the RRC reestablishment or the handover procedure through a relay or a cell corresponding to the strongest RSRP in an RSRP of the available relay and an RSRP of the suitable cell to access the first cell.

In a possible implementation, prior to performing the RRC reestablishment or the handover procedure through the at least one of the available relay or the suitable cell to access the first cell, the processing unit 502 is further configured to: perform handover according to a corresponding configuration of a second candidate relay to access the second candidate relay, when the available relay is the second candidate relay, where the second candidate relay is one of at least one candidate relay configured by a network.

In a possible implementation, prior to performing the RRC reestablishment or the handover procedure through the at least one of the available relay or the suitable cell to access the first cell, the processing unit 502 is further configured to: determine the available relay from relays other than the second candidate relay, among the at least one candidate relay, when failure occurs during handover to the second candidate relay.

Figure 6:
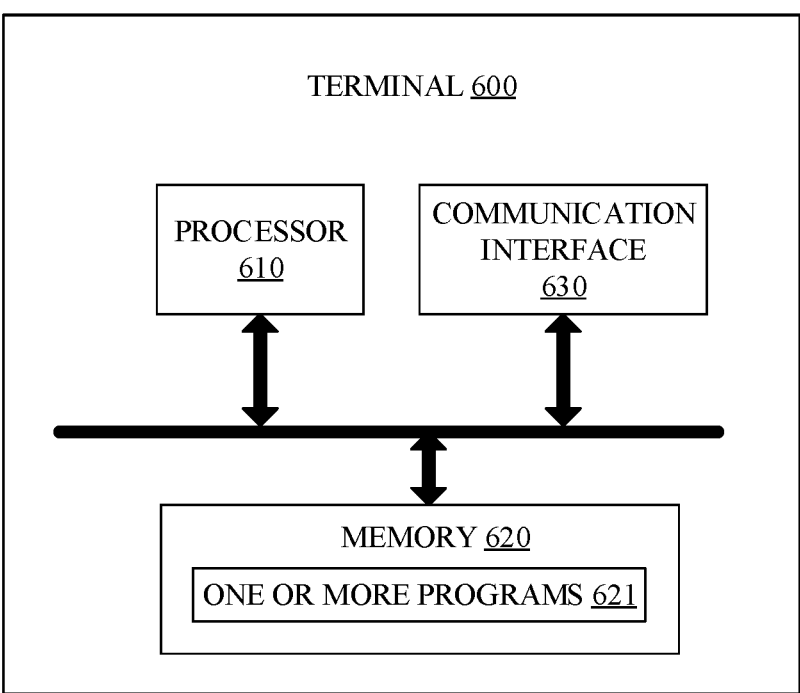
FIG. 6 is a schematic structural diagram of a terminal provided in implementations of the disclosure.

Referring to FIG. 6, FIG. 6 is a schematic structural diagram of a terminal provided in implementations of the disclosure. The terminal 600 includes a processor 610, a memory 620, a communication interface 630, and at least one communication bus for connecting the processor 610, the memory 620, and the communication interface 630.

The memory 620 includes, but is not limited to, a random access memory (RAM), a read-only memory (ROM), an erasable programmable read-only memory (EPROM), or a compact disc read-only memory (CD-ROM). The memory 620 is used for relevant instructions and data.

The communication interface 630 is used for receiving and sending data.

The processor 610 can be one or more CPUs. In the case where the processor 610 is one CPU, the CPU can be a single-core CPU or a multi-core CPU.

The processor 610 in terminal 600 is used to read one or more programs 621 stored in memory 620 to perform: determining at least one of an available relay or a suitable cell, when a radio link failure or a handover failure is detected by the terminal; and performing an RRC reestablishment or a handover procedure through the at least one of the available relay or the suitable cell to access a first cell, where the first cell includes a cell accessed by the available relay or the suitable cell.

As can be seen, when the terminal detects the radio link fail or the handover fail, the terminal determines the available relay and/or the suitable cell. The terminal then performs the RRC reestablishment or the handover procedure through the available relay and/or the suitable cell to access the first cell. When the terminal detects the radio link failure or the handover failure, due to not finding the suitable cell, the terminal will easily enter an idle state, and the terminal is unable to continue to carry out a service. Therefore, in the disclosure, the RRC reestablishment or the handover procedure is performed through the available relay and/or the suitable cell, so that the terminal can access a cell accessed by the available relay or access the suitable cell, thereby reducing time delay in resuming an RRC connection, ensuring the terminal to resume the RRC connection or data communication as soon as possible, improving a chance that the terminal resumes the RRC connection, and ensuring the terminal to continue to carry out a service.

It should be noted that, each operation can be implemented using the corresponding description of the above method implementations illustrated in FIG. 4. The terminal 600 can be used to perform the method at the terminal side of the above method implementations of the disclosure, which will not be repeated herein.

Implementations of the disclosure further provide a chip. The chip includes a processor. The processor is configured to invoke a computer program from a memory and run the computer program to cause a device installed with the chip to perform some or all of operations described in the terminal in the above method implementations.

Implementations of the disclosure further provide a non-transitory computer-readable storage medium. The non-transitory computer-readable storage medium stores a computer program for electronic data interchange. The computer program causes a computer to perform some or all of operations described in the terminal in the above method implementations.

Implementations of the disclosure further provide a computer program. The computer program is operable to cause a computer to perform some or all of operations described in the above method implementations of the disclosure. The computer program can be a software installation package.

Implementations of the disclosure further provide a computer program product. The computer program product includes a computer program. The computer program is operable to cause a computer to perform some or all of operations described in the terminal in the above method implementations. The computer program product can be a software installation package.

The operations of the method or algorithm described in implementations of the disclosure may be implemented in the form of hardware or in the form of executing software instructions by the processor. The software instructions may consist of corresponding software modules that may be stored in random access memory (RAM), flash memory, read only memory (ROM), erasable programmable ROM (EPROM), electrically EPROM (EEPROM), register, hard disk, movable hard disk, CD-ROM, or any other form of storage medium well known in the art. An exemplary storage medium is coupled to a processor to enable the processor to read information from and write information to the storage medium. Apparently, the storage medium can also be part of the processor. The processor and the storage medium may be in the ASIC. In addition, the ASIC may be in the terminal or management device. Apparently, the processor and the storage medium may also exist as discrete components in the terminal or management device.

Those skilled in the art should recognize that, in the above one or more examples, all or part of functions described in the above implementations can be implemented through software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

The above-mentioned specific implementations further describe purposes, technical solutions, and advantageous effects of implementations of the disclosure in detail. It should be understood that, the above description is only the specific implementations of the disclosure and is not intended to limit the protection scope of implementations of the disclosure. Any modifications, equivalent substitutions, and improvements made on the basis of the technical solutions of implementations of the disclosure should be included in the protection scope of implementations of the disclosure.

What is claimed is:

1. A method for wireless communication, performed by a terminal and comprising:

when a radio link failure is detected by the terminal, performing a relay discovery procedure to determine an available relay and performing a cell selection procedure to determine a suitable cell;

when the available relay has been found by the terminal, stopping the cell selection procedure; and performing a radio resource control (RRC) reestablishment through the available relay; and when both the available relay and the suitable cell have been found simultaneously by the terminal, performing the RRC reestablishment through the available relay or the suitable cell to access a first cell, the first cell comprising a cell accessed by the available relay or the suitable cell.

2. The method of claim 1, wherein the relay discovery procedure comprises: receiving first information, wherein the first information indicates at least one relay providing a relay service; or the relay discovery procedure comprises: sending a relay request message, and receiving second information in response to the relay request message, wherein the second information indicates at least one relay providing the relay service.

3. The method of claim 1, further comprising:

performing a relay detection procedure to determine the available relay, wherein the relay detection procedure comprises: obtaining a signal sent by the at least one relay, and determining whether the signal sent by the at least one relay satisfies a first preset condition.

4. The method of claim 3, wherein the signal sent by the at least one relay comprises at least one of: a synchronization signal or a demodulation reference signal.

5. The method of claim 3, wherein the first preset condition comprises: a quality of the signal sent by the at least one relay exceeding a preset threshold, when the terminal detects the quality of the signal sent by the at least one relay.

6. The method of claim 1, wherein performing the relay discovery procedure to determine the available relay comprises:

performing the relay discovery procedure to determine at least one relay; and performing a relay detection procedure, and determining a relay satisfying a first preset condition among the at least one relay as the available relay.

7. The method of claim 6, wherein when the number of relays satisfying the first preset condition among the at least one relay is greater than or equal to 2, the available relay satisfies one of: the available relay being a random relay among the relays satisfying the first preset condition or the available relay being a relay with the strongest reference signal received power (RSRP) among the relays satisfying the first preset condition.

8. The method of claim 1, wherein the cell selection procedure is performed by the terminal if no available relay is found when the relay discovery procedure is performed by the terminal.

9. The method of claim 3, wherein the at least one of the relay discovery procedure or the relay detection procedure is performed by the terminal in parallel or simultaneously with the cell selection procedure.

10. The method of claim 3, wherein the at least one of the relay discovery procedure or the relay detection procedure is preferentially performed by the terminal.

11. A terminal, comprising a processor, a memory, a communication interface, and one or more programs stored in the memory, the programs comprising instructions which, when executed by the processor, cause the processor to:

when a radio link failure is detected by the terminal, perform a relay discovery procedure to determine an available relay and perform a cell selection procedure to determine a suitable cell;

when the available relay has been found by the terminal, stop the cell selection procedure; and perform a radio resource control (RRC) reestablishment through the available relay; and when both the available relay and the suitable cell have been found simultaneously by the terminal, perform the RRC reestablishment through the available relay or the suitable cell to access a first cell, the first cell comprising a cell accessed by the available relay or the suitable cell.

12. A non-transitory computer-readable storage medium storing a computer program, wherein the computer program, when executed by a terminal, causes the terminal to:

when a radio link failure is detected by the terminal, perform a relay discovery procedure to determine an available relay and perform a cell selection procedure to determine a suitable cell;

when the available relay has been found by the terminal, stop the cell selection procedure; and perform a radio resource control (RRC) reestablishment through the available relay; and when both the available relay and the suitable cell have been found simultaneously by the terminal, perform the RRC reestablishment through the available relay or the suitable cell to access a first cell, the first cell comprising a cell accessed by the available relay or the suitable cell.

13. The terminal of claim 11, wherein the relay discovery procedure comprises: receiving first information, wherein the first information indicates at least one relay providing a relay service; or the relay discovery procedure comprises: sending a relay request message, and receiving second information in response to the relay request message, wherein the second information indicates at least one relay providing the relay service.

14. The terminal of claim 11, wherein the processor configured to perform the relay discovery procedure to determine the available relay is configured to:

perform the relay discovery procedure to determine at least one relay; and perform a relay detection procedure, and determine a relay satisfying a first preset condition among the at least one relay as the available relay.

15. The terminal of claim 14, wherein when the number of relays satisfying the first preset condition among the at least one relay is greater than or equal to 2, the available relay satisfies one of: the available relay being a random relay among the relays satisfying the first preset condition or the available relay being a relay with the strongest reference signal received power (RSRP) among the relays satisfying the first preset condition.

16. The terminal of claim 11, wherein the cell selection procedure is performed by the terminal if no available relay is found when the relay discovery procedure is performed by the terminal.

17. The non-transitory computer-readable storage medium of claim 12, wherein the relay discovery procedure comprises: receiving first information, wherein the first information indicates at least one relay providing a relay service; or the relay discovery procedure comprises: sending a relay request message, and receiving second information in response to the relay request message, wherein the second information indicates at least one relay providing the relay service.

18. The non-transitory computer-readable storage medium of claim 12, wherein the computer program executed by the terminal to perform the relay discovery procedure to determine the available relay is executed by the terminal to:

perform the relay discovery procedure to determine at least one relay; and perform a relay detection procedure, and determine a relay satisfying a first preset condition among the at least one relay as the available relay.

19. The non-transitory computer-readable storage medium of claim 18, wherein when the number of relays satisfying the first preset condition among the at least one relay is greater than or equal to 2, the available relay satisfies one of: the available relay being a random relay among the relays satisfying the first preset condition or the available relay being a relay with the strongest reference signal received power (RSRP) among the relays satisfying the first preset condition.

20. The non-transitory computer-readable storage medium of claim 12, wherein the cell selection procedure is performed by the terminal if no available relay is found when the relay discovery procedure is performed by the terminal.

* * * * *